Aug. 11, 1970   J. DONIGER ET AL   3,523,664
TERMINAL FLARE CONTROLLER
Filed March 28, 1968   2 Sheets-Sheet 1

INVENTORS:
FRED J. BELSKY
JERRY DONIGER
BY   WALTER A. PLATT

ATTORNEY

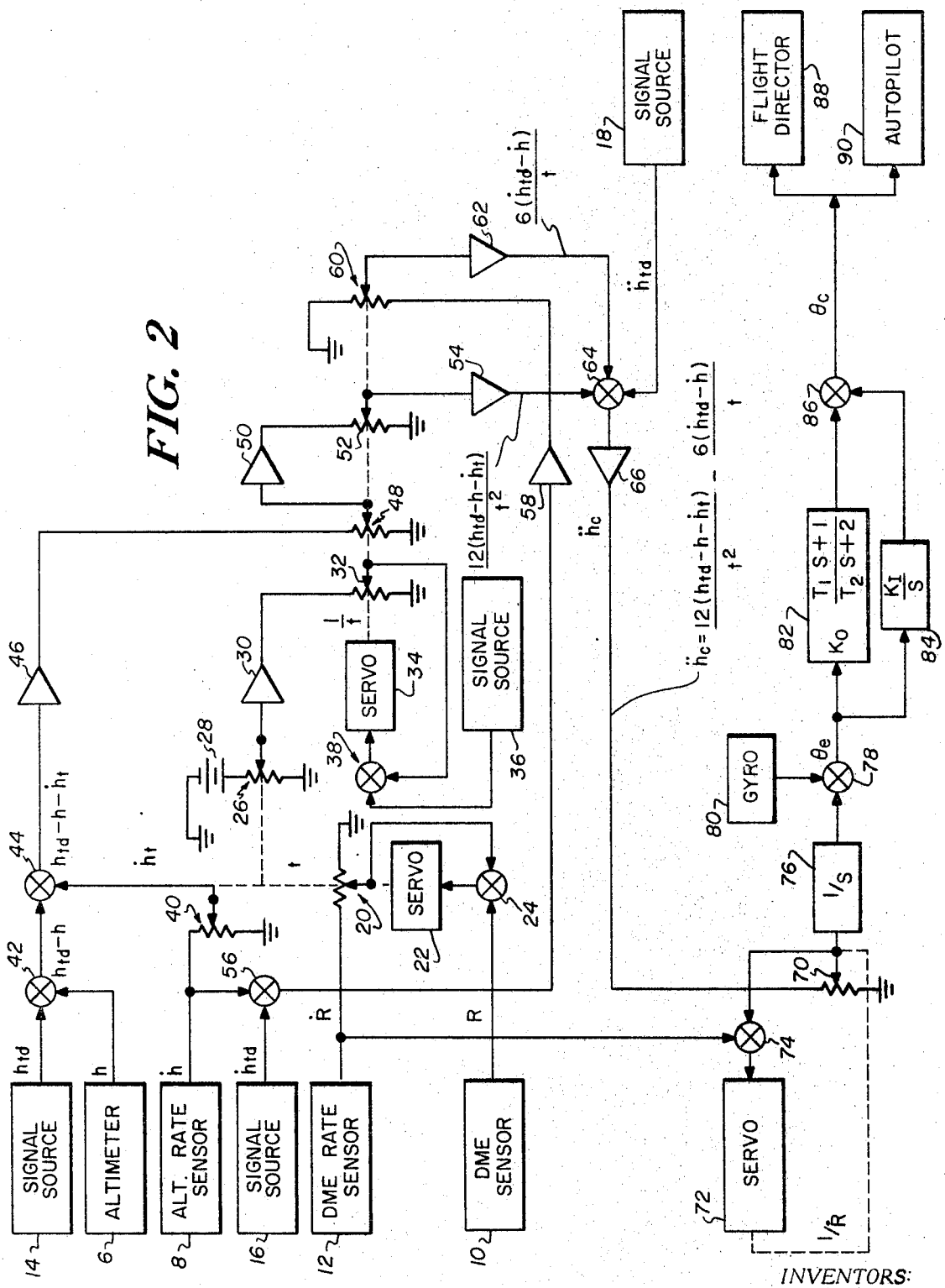

United States Patent Office 3,523,664
Patented Aug. 11, 1970

3,523,664
TERMINAL FLARE CONTROLLER
Jerry Doniger, Montvale, and Walter A. Platt, Fairlawn, N.J., and Fred J. Belsky, Beverly Hills, Calif., assignors to The Bendix Corporation, a corporation of Delaware
Filed Mar. 28, 1968, Ser. No. 716,903
Int. Cl. B64c 13/50
U.S. Cl. 244—77　　　　　　　　　　　　　　　　8 Claims

ABSTRACT OF THE DISCLOSURE

Apparatus for controlling an aircraft during landing. Signals corresponding to aircraft altitude, altitude rate, slant range, slant range rate and pitch attitude, and signals corresponding to desired terminal altitude, altitude rate and altitude acceleration are provided. The craft is controlled in response to all of said signals for following a flare path to touchdown.

BACKGROUND OF THE INVENTION

Field of the invention

This invention reates to aircraft control apparatus and, more particularly, to apparatus for landing an aircraft.

Description of the prior art

Prior to the present invention flare controllers known in the art were of the type wherein each variable to be controlled has an operating equation associated with it and the controller operates to provide commands for satisfying the equations. What results is a constant switching to satisfy the individual equations so that predetermined terminal conditions for safe landings are met. The device of the present invention operates on the same type of equations but generates a single command which satisfies all of the equations at any one time and provides more desirable continuous control to touchdown.

SUMMARY OF THE INVENTION

This invention contemplates a system for landing an aircraft including means for providing a signal corresponding to time to touchdown in response to slant range and slant range rate signals. A first combined signal is provided in response to the time to touchdown signal, an aircraft altitude signal, an aircraft altitude rate signal and a desired terminal altitude signal, and a second combined signal is provided in response to the aircraft attitude rate signal, a desired terminal altitude rate signal and the time to touchdown signal. The first and second combined signals and a desired terminal altitude acceleration signal are combined to provide an acceleration command signal and the acceleration command signal is combined with a pitch attitude signal for providing a pitch control signal to control the craft during landing.

One object of this invention is to provide control apparatus for landing an aircraft safely.

Another object of this invention is to control an aircraft during landing so that predetermined terminal conditions are met.

Another object of this invention is to provide an aircraft altitude acceleration command which is a function of the time to touchdown .

Another object of this invention is to provide a flare controller which may be easily changed from a two condition to a three condition controller.

Another object of this invention is to provide a single command which satisfies all of a plurality of parametric equations at any one time for continuously controlling an aircraft to touchdown.

Another object of this invention is to provide a flare controller wherein it is not necessary to minimize tracking errors since no particular track is preselected and disturbances merely cause the track of the craft to change to meet desired touchdown conditions.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 2 is a block diagram showing a terminal flare controller according to the invention.

DESCRIPTION OF THE INVENTION

Figure 1:
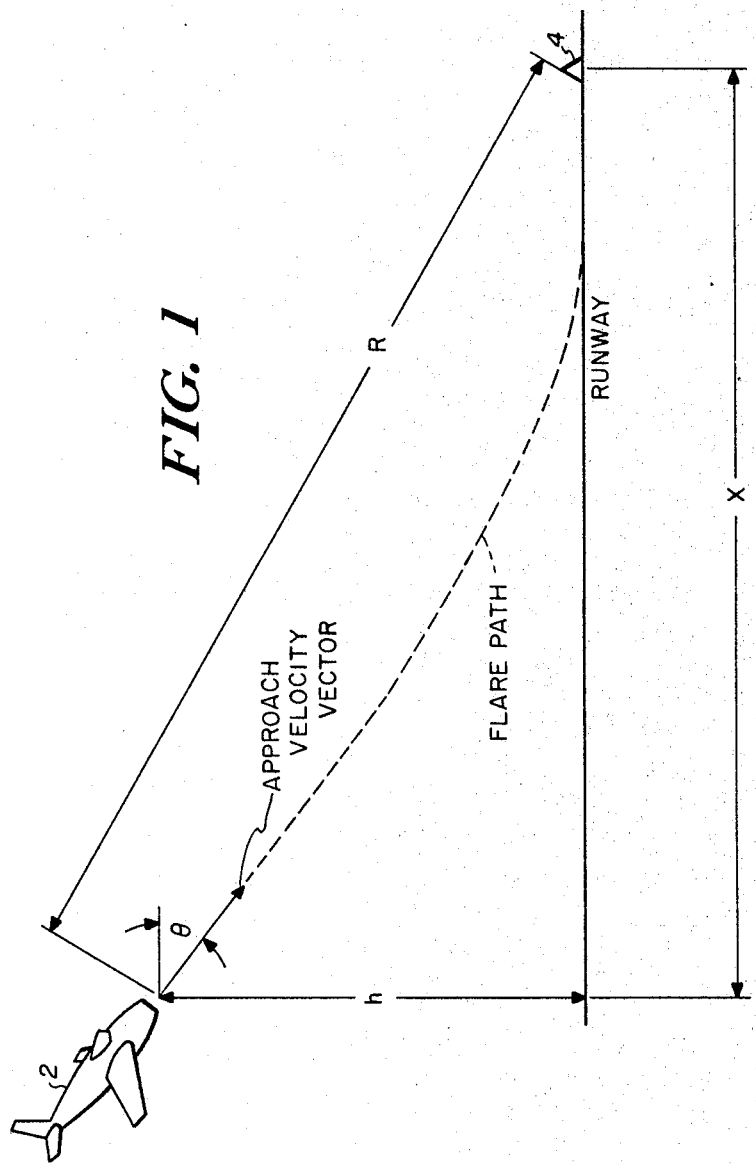
FIG. 1 is a diagrammatic representation of a flight path profile showing the parameters of the present invention.

With reference to FIG. 1, an aircraft 2 is flying a path $\theta°$ from the horizontal and at an altitude $h$ above the extended plane of a runway. Aircraft 2 is at a ground distance $x$ from a ground based DME (distance measuring equipment) station 4, with the slant range of aircraft 2 from DME station 4 being designated as R.

It is assumed that aircraft altitude $h$, altitude rate $\dot{h}$, ground distance $x$ and ground speed $\dot{x}$ are known quantities. The problem is to provide a command for controlling the flight of aircraft 2 to meet specified terminal or touchdown conditions. A suitable control function is altitude acceleration $\ddot{h}$ of aircraft 2 since it is possible to form a closed control loop for this function by measuring the appropriately corrected acceleration on the air frame or, as will be hereinafter explained, to convert an acceleration command to a pitch attitude command.

In consideration of the above, the time to touchdown, $t$, is calculated as follows:

$$t = x/\dot{x} \tag{1}$$

Considering aircraft 2 as a weightless particle in space, the path to be followed from any given time $t'$ can be expressed as a power series in $t$:

$$h = a_0 + a_1 t + a_2 t^2 + a_3 t^3 + a_4 t^4 \tag{2}$$

Differentiating with respect to $t$:

$$dh/dt = a_1 + 2a_2 t + 3a_3 t^2 + 4a_4 t^3 \tag{3}$$

and $$d^2h/dt^2 = 2a_2 + 6a_3 t + 12a_4 t^2 \tag{4}$$

then $$\dot{h} = dh/dt \tag{5}$$

and $$\ddot{h} = d^2h/dt^2 \tag{6}$$

At touchdown, $t$ equals zero and the coefficients $a_0$, $a_1$ and $a_2$ are equal to the desired conditions as follows:

$$a_0 = h_{td}$$
$$a_1 = \dot{h}_{td}$$
$$2a_2 = \ddot{h}_{td}$$

wherein $h_{td}$ is a predetermined desired terminal altitude, $\dot{h}_{td}$ is a predetermined desired terminal altitude rate and $\ddot{h}_{td}$ is a predetermined desired terminal acceleration.

Solving for the remaining coefficients $a_3$ and $a_4$ from Equations 2 and 3, and substitution in Equation 4, an expression for the required altitude acceleration command $\ddot{h}_c$ is provided as follows:

$$\ddot{h}_c = \frac{12(h_{td}-h-\dot{h}t)}{t^2} - 6\frac{(\dot{h}_{td}-\dot{h})}{t} + \ddot{h}_{td} \quad (7)$$

If the aircraft landing speed is very near stall speed, $\ddot{h}_{td}$ is set equal to zero. If terminal acceleration is not specified, a power series with one less term is used in the derivation and the corresponding two-terminal condition command is as follows:

$$\ddot{h}_c = \frac{6(h_{td}-h-\dot{h}t)}{t^2} - \frac{2(\dot{h}_{td}-\dot{h})}{t} \quad (8)$$

The implementation of Equation 7 according to the invention is shown in FIG. 2. An altimeter 6 provides a signal $h$ corresponding to the altitude of aircraft 2 and an altitude rate sensor 8 provides a signal $\dot{h}$ corresponding to the altitude rate of aircraft 2. DME sensors 10 and 12 provide signals corresponding to slant range R and slant range rate $\dot{R}$, respectively.

A signal source 14 provides a signal $h_{td}$ corresponding to a predetermined desired terminal altitude and a signal source 16 provides a signal $\dot{h}_{td}$ corresponding to a predetermined desired terminal altitude rate. A signal source 18 provides a signal $\ddot{h}_{td}$ corresponding to a predetermined desired terminal altitude acceleration of aircraft 2. It is to be noted that terminal altitude $h_{td}$ is usually the height of the aircraft receiving antenna above the ground when the craft is on the ground. Terminal altitude rate $\dot{h}_{td}$ is set to a value of —2 ft. per second to insure positive ground contact with minimum impact loading on aircraft 2. Terminal altitude acceleration $\ddot{h}_{td}$ is set at zero to insure maximum maneuvering capability.

Slant range rate signal $\dot{R}$ from sensor 12 is applied to a feedback potentiometer 20 of a servo 22 for exciting the potentiometer. The output from feedback potentiometer 20 is applied to a summing means 24 and summed thereby with slant range signal R from sensor 10. The summed signal drives servo 22 so that the output shaft position of servo 22 corresponds to the ratio R/Ṙ and which ratio is the time $t$ to touchdown.

A potentiometer 26 is coupled by suitable mechanical means to the output shaft of servo 22 and is excited by a suitable source of constant direct current shown as a battery 28. The signal from potentiometer 26 corresponds to time $t$, and which signal is applied through an isolation amplifier 30 to a feedback potentiometer 32 of a servo 34.

A signal source 36 provides a signal corresponding to unity and which signal is applied to a summing means 38 and summed thereby with the time signal from feedback potentiometer 32. The summed signal drives servo 34 so that the output shaft position of servo 34 corresponds to $1/t$. In this connection, it is to be noted that the flare maneuver generally starts at least ten seconds prior to touchdown and the scaling is arranged so that servos 22 and 34 operate over a time range from zero (touchdown) to 60 seconds from touchdown to allow synchronization and monitoring to take place.

A potentiometer 40 is coupled by suitable mechanical means to the output shaft of servo 22 and is excited by altitude rate signal $\dot{h}$ from sensor 8. Potentiometer 40 provides a signal $\dot{h}t$ which corresponds to the product of the altitude rate signal $\dot{h}$ and time to touchdown signal $t$.

Altitude signal $h$ from altimeter 6 and predetermined desired terminal altitude signal $h_{td}$ from signal source 14 are applied to a summing means 42 and summed thereby. The summed signal is applied to a summing means 44 and summed thereby with signal $\dot{h}t$ from potentiometer 40. The summed signal from summing means 44 is applied to an isolation amplifier 46 and therefrom to a potentiometer 48 coupled by suitable mechanical means to the output shaft of servo 34 for exciting potentiometer 48. The signal from potentiometer 48 is applied to an isolation amplifier 50 and therefrom to a potentiometer 52 coupled by a suitable mechanical means to the output shaft of servo 34. The signal from potentiometer 52 is applied to an amplifier 54 having a gain of 12 in accordance with the first term of Equation 7. The output from amplifier 54 is represented as follows:

$$12\frac{(h_{td}-h-\dot{h}t)}{t^2}$$

Altitude acceleration command signal $\dot{h}_c$ is applied to summing means 56 and summed thereat with predetermined desired terminal altitude signal $\dot{h}_{td}$ from signal source 16. The output from summation means 56 is applied to an amplifier 58 and therefrom to a potentiometer 60 coupled by suitable mechanical means to the output shaft of servo 34 for exciting potentiometer 60. The signal from potentiometer 60 is applied to an amplifier 62 having a gain of 6 in accordance with the second term of Equation 7. The output from amplifier 62 is represented as follows:

$$6\frac{(\dot{h}_{td}-\dot{h})}{t}$$

The signals from amplifiers 54 and 62 and predetermined desired terminal acceleration signal $\ddot{h}_{td}$ from signal source 18 are applied to a summing means 64. Since signal $\ddot{h}_{td}$ is zero as heretofore noted, the summed signal from summing means 64 corresponds to the difference between the signals from amplifiers 54 and 62. The summed signal from summing means 64 is applied to an amplifier 66 and which amplifier 66 provides an altitude acceleration command $\ddot{h}_c$ in accordance with Equation 7. It is to be noted that if a two condition terminal controller is required, it is only necessary to change the gain of amplifiers 54 and 62 to 6 and 2, respectively, to provide altitude acceleration command signal $\ddot{h}_c$ in accordance with Equation 8.

Altitude acceleration command signal $\ddot{h}_c$ is applied to a feedback potentiometer 70 of a servo 72 for exciting potentiometer 70. Potentiometer 70 provides a signal which is applied to a summation means 74 and summed thereby with slant range rate signal $\dot{R}$ from sensor 12. The output from summation means 74 corresponds to the rate of change $\dot{\theta}$ of flight path angle $\theta$ shown in FIG. 1. Angle $\dot{\theta}$, which is very nearly equal to a pitch rate command $\theta_c$, is applied to an integrator 76. The integrator signal is applied to a summation means 78 and summed thereby with a pitch attitude signal from a vertical gyro 80. The signal from summation means 78 corresponds to a pitch attitude error signal $\theta_e$, and which signal $\theta_e$ is applied to a lead network 82 and to an integrator 84. The signals from lead network 82 and from integrator 84 are applied to a summation means 86 and summed thereby, with the summed signal from summing means 86 corresponding to a pitch attitude control signal $\theta_c$. Lead network 82 and integrator 84 provide the signals required to obtain the desired stability and accuracy with the pilot-airplane combination in response to attitude error signal $\theta_e$. Signal $\theta_c$ is applied to a flight director 88 or to an autopilot 90 for controlling aircraft 2 to touchdown.

From the aforegoing description of the invention it is seen that command altitude acceleration signal $\ddot{h}_c$ is not constant but is a function of time to touchdown $t$. The command is continuously and automatically computed in such a way that the craft lands with the desired terminal conditions.

The device is changed from a two condition controller to a three condition controller merely by changing the control equation coefficients as heretofore explained and providing a constant signal for desired terminal altitude rate.

No open loop programming or high track loop gains are required to minimize track errors since no particular track is selected and disturbances only cause the track of the craft to change to meet the desired touchdown requirements.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for controlling an aircraft when landing, comprising:
   means for providing an aircraft altitude signal;
   means for providing an aircraft altitude rate signal;
   means for providing a slant range signal;
   means for providing a slant range rate signal;
   means for providing a pitch attitude signal;
   means for providing a predetermined terminal altitude signal;
   means for providing a predetermined terminal altitude rate signal;
   means for providing a predetermined terminal altitude acceleration signal;
   means connected to the slant range and slant range rate signal means and responsive to the signals therefrom for providing a time to touchdown signal;
   means connected to the time to touchdown signal means, the aircraft altitude signal means, the aircraft altitude rate signal means and the predetermined terminal altitude signal means, and responsive to the signals therefrom for providing a first signal;
   means connected to the aircraft altitude rate signal means, the predetermined terminal altitude rate signal means and the time to touchdown signal means, and responsive to the signals therefrom for providing a second signal;
   means connected to the first signal means, the second signal means and the desired terminal altitude acceleration signal means and responsive to the signals therefrom to provide an acceleration command signal; and
   means connected to the acceleration command signal means, to the pitch altitude signal means to the slant range rate signal means and responsive to the signals therefrom for providing a pitch control signal to control the craft when landing.

2. Apparatus for controlling an aircraft as described by claim 1, wherein:
   the means connected to the slant range and slant range rate signal means and responsive to the signals therefrom for providing a time to touchdown signal includes means for dividing the slant range signal by the slant range rate signal.

3. Apparatus for controlling an aircraft as described by claim 1, wherein the means connected to the time to touchdown signal means, the aircraft altitude signal means, the aircraft altitude rate signal means and the predetermined terminal altitude signal means, and responsive to the signals therefrom for providing a first signal includes:
   first summing means connected to the aircraft altitude signal means and to the predetermined terminal altitude signal means for summing the signals therefrom;
   multiplier connected to the time to touchdown signal means and to the altitude rate signal means for multiplying the signals therefrom;
   second summing means connected to the multiplier and to the first summing means for summing the signals therefrom;
   means connected to the time to touchdown signal means for providing a signal corresponding to the reciprocal of the time to touchdown;
   means connected to the time to touchdown signal means and to the reciprocal time to touchdown signal means for providing a signal corresponding to the square of the reciprocal time to touchdown signal; and
   means connected to the last mentioned means and to the second summing means and responsive to the signals therefrom for providing the first signal.

4. Apparatus as described by claim 3, wherein the means connected to the last mentioned means and to the second summing means and responsive to the signals therefrom for providing the first signal includes:
   means for dividing the signal from the second summing means by the signal corresponding to the square of the reciprocal time to touchdown signal; and
   means for adjusting the gain of the divided signal to a predetermined level for providing the first signal.

5. Apparatus for controlling an aircraft as described by claim 1, wherein the means connected to the aircraft altitude rate signal means, the predetermined terminal altitude rate signal means and the time to touchdown signal means and responsive to the signals therefrom for providing a second signal includes:
   means connected to the altitude rate signal means and to the predetermined terminal altitude rate signal means for summing the signals therefrom; and
   means connected to the summing means and to the time to touchdown signal means and responsive to the signals therefrom for providing the second signal.

6. Apparatus as described by claim 5, wherein the means connected to the summing means and to the time to touchdown signal means and responsive to the signals therefrom for providing the second signal includes:
   means for dividing the signal from the summing means by the time to touchdown signal; and
   means for adjusting the gain of the divided signal to a predetermined level for providing the second signal.

7. Apparatus as described by claim 1, wherein:
   the means connected to the first signa' means, to the second signal means and to the predetermined terminal altitude acceleration signal means, and responsive to the signals therefrom for providing an acceleration command signal includes:
   means for summing said signals, with the summation signal being the acceleration command signal.

8. Apparatus as described by claim 1 wherein the means connected to the acceleration command signal means, to the pitch attitude signal means and to the slant rate signal means and responsive to the signals therefrom for providing a pitch control signal to control the craft while landing includes:
   means connected to the acceleration command signal means and to the slant range rate signal means for providing a pitch rate command signal;
   means connected to the pitch rate command signal means for integrating the signal therefrom;
   means for providing a pitch attitude signal;
   means connected to the integrating means and to the pitch attitude signal means and responsive to the signals therefrom for providing a pitch error signal;
   a lead network connected to the pitch error signal means and responsive to the signal therefrom for providing a leading signal;

an integrator connected to the pitch error signal means for integrating the signal therefrom; and means connected to the lead network and to the integrator and responsive to the signals therefrom for providing the control signal.

References Cited

UNITED STATES PATENTS

| | | |
|---|---|---|
| 2,830,291 | 4/1958 | Hecht et al. |
| 3,031,662 | 4/1962 | Bond _____ 343—108 |
| 3,059,880 | 10/1962 | Buxton. |
| 3,265,333 | 8/1966 | Montootl. |
| 3,291,421 | 12/1966 | Kramer et al. |

FERGUS S. MIDDLETON, Primary Examiner

J. L. FORMAN, Assistant Examiner

U.S. Cl. X.R.

343—108